Oct. 10, 1961  G. D. HAUGLAND  3,003,812
ANTI-GLARE DEVICE

Filed June 16, 1960  2 Sheets-Sheet 1

GLEN D. HAUGLAND,
INVENTOR.

BY

PATENT AGENT.

Oct. 10, 1961    G. D. HAUGLAND    3,003,812
ANTI-GLARE DEVICE
Filed June 16, 1960    2 Sheets-Sheet 2
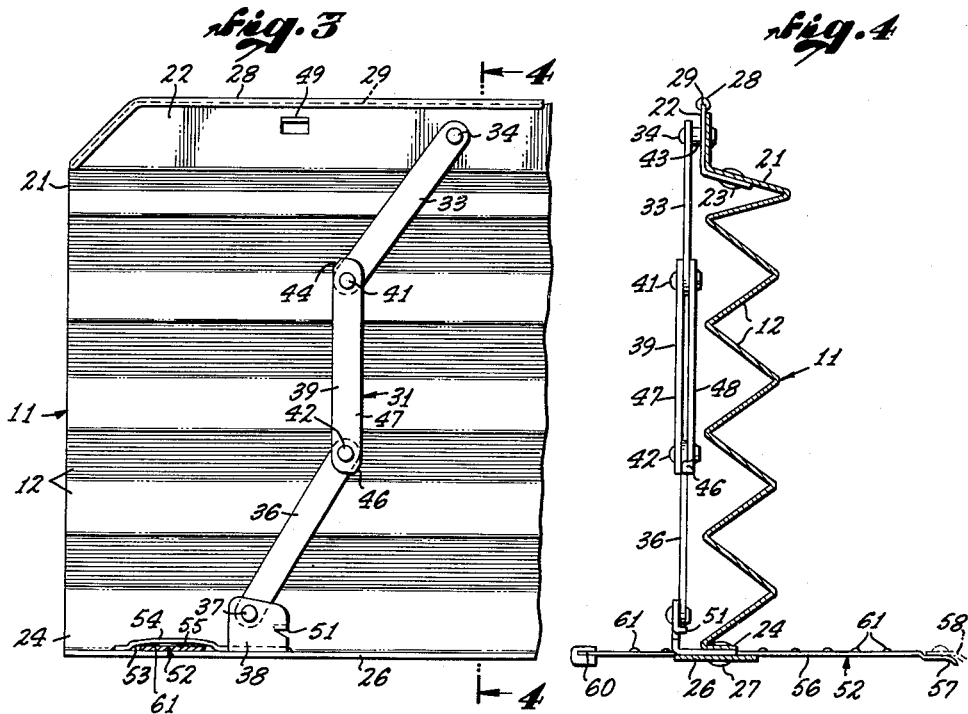
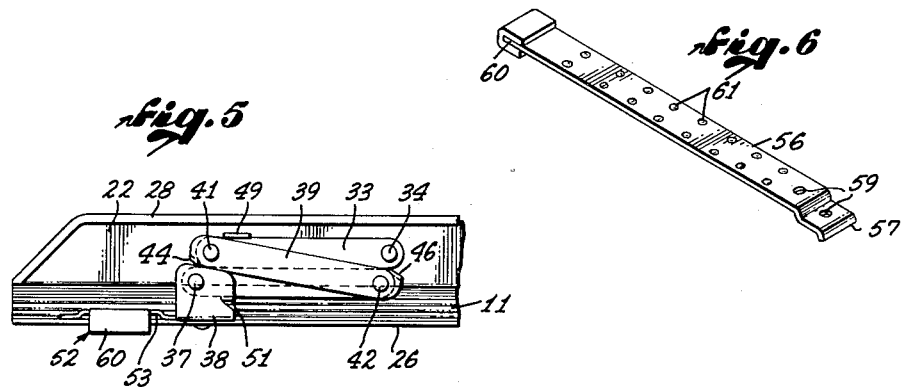
GLEN D. HAUGLAND,
INVENTOR.
BY
PATENT AGENT.

United States Patent Office 3,003,812
Patented Oct. 10, 1961

3,003,812
ANTI-GLARE DEVICE
Glen D. Haugland, 1513 Indiana Ave. NE.,
Albuquerque, N. Mex.
Filed June 16, 1960, Ser. No. 36,623
4 Claims. (Cl. 296—97)

This invention relates to an anti-glare device and more particularly to an extensible and collapsible anti-glare panel adjustably and removably secured as on a dashboard of a motor vehicle, boat, or the like, for eliminating or modifying the glare of reflected light from the hood of the motor vehicle or from shiny ornamentations or accessories mounted thereon, or from the deck of a boat, the panel being interposed between occupants of the vehicle and the source of glare.

This invention features a collapsible and extensible panel of translucent or opaque material which is universally mounted on all vehicles and positionable in parallel or non-parallel relationship of its pleats or folds so as to be adjustable to counter the source of glare yet afford a maximum amount of unimpaired vision to the driver and/or occupants of the vehicle. The panel is extended or collapsed by means of a pair of spaced hinge means, each being independently operable to position the folds or pleats of the panel in parallel or non-parallel, angular relationship, the panel being collapsible to a minimum height for unobstructed viewing through the windshield of the vehicle.

It is an object of this invention to provide a new and improved anti-glare device for a motor vehicle, boat, or the like, for intercepting and eliminating or appreciably decreasing the glare reflected from the hood, deck, ornamentations and accessories of the vehicle to the eyes of the occupants of the vehicle.

It is another object of this invention to provide a new and improved anti-glare device which is easily and readily positionable to intercept the reflected glare and is positionable in parallel or angular relationship for intercepting annoying glare yet affording maximum vision through the windshield of the vehicle.

Yet another object of this invention is to provide a new and improved anti-glare device which is completely collapsible for full vision through the windshield.

A further object of this invention is to provide a new and improved anti-glare device of the character described which is universally mountable on any vehicle and adjustable relative to its mounting for most effective positioning of the device relative to the vehicle.

A still further object of this invention is to provide a new and improved anti-glare device of the character described which is economical to manufacture and capable of mass production.

A general object of this invention is to provide a new and improved anti-glare device of the character described which overcomes disadvantages of prior means and methods heretofore intended to accomplish generally similar purposes.

These and other objects of this invention will be more apparent from the following detailed description, drawings and appended claims.

In the drawings:

FIGURE 3 is an enlarged, fragmentary side view of the device illustrated as being extended into the maximal extension position of FIGURE 1;

FIGURE 4 is a vertical, cross-sectional view, as taken substantially along the line 4—4 of FIGURE 3;

FIGURE 5 is a fragmentary side view, in elevation, similar to FIGURE 3 with the exception that the device is shown in its fully collapsed position; and FIGURE 6 is a perspective view, in elevation, illustrating a support member of the invention in greater detail.

Referring in detail to the drawings, there is shown by way of illustration, but not of limitation, an anti-glare device designed and constructed in accordance with this invention and generally referred to by the numeral 10. The device 10 comprises a multi-pleated, collapsible panel 11 having a plurality of elongated panels 12 hingedly connected together along lateral edges or formed integrally of a single sheet of relatively rigid material such as plastic, paper, cloth, or the like. The panels 12, and thereby the entire panel 11, are preferably of an opaque material capable of blocking light rays. Optionally, a translucent material capable of filtering or modifying a glaring light ray reflected thereagainst may be used.

Figure 1:
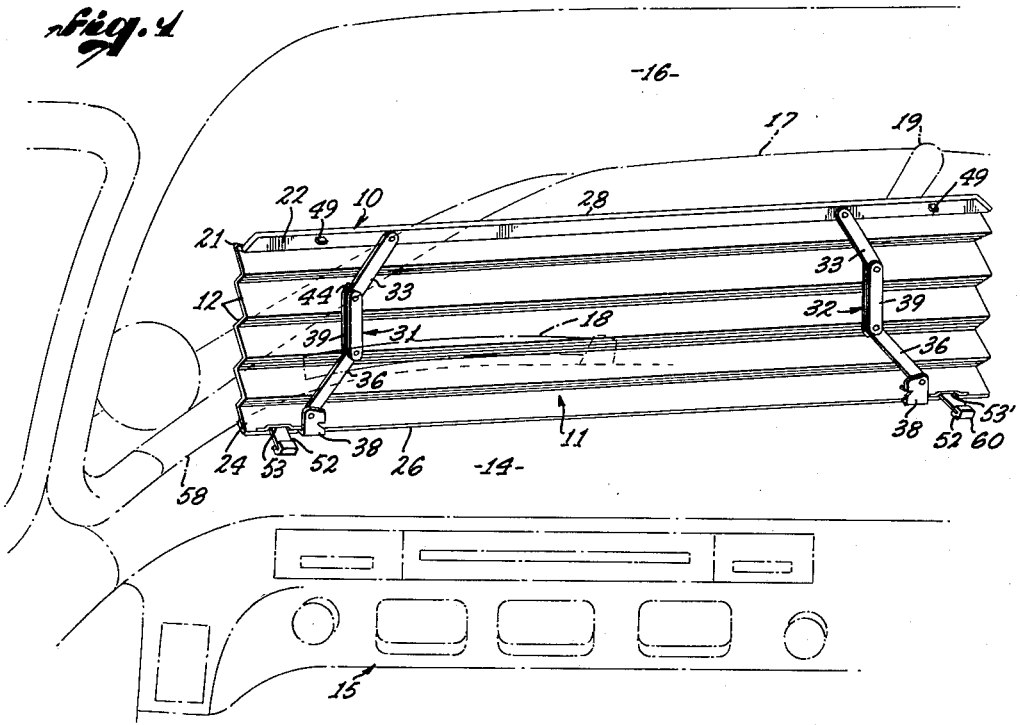
FIGURE 1 is a perspective view, in elevation, illustrating the anti-glare device of my invention as installed in a motor vehicle and extended into its maximum extended position.

The device 10 is adapted to be mounted on a dashboard or shelf of the motor vehicle or a deck of a boat. The device is herein illustrated as being mounted on the dashboard 14 of a motor vehicle 15 (shown in broken lines) adjacent to the windshield 16 thereof, and between the windshield and the occupants of the vehicle so as to block or intercept glaring light rays reflected from the hood 17, an accessory like the windshield wiper 18, or an ornamentation such as the hood ornament indicated at 19. In a vehicle such as an automobile where more than one occupant is seated before the windshield, it is preferable that at least a pair of devices 10 be mounted on the dashboard 14 for individual use of occupants, each being independently adjustable. Only one device 10 is illustrated in FIGURE 1, as being mounted between the windshield and the driver's position on the left side of the vehicle; it is to be understood, however, that if desired, another device like 10 may be mounted on the right side of the dashboard and between the windshield and a passenger occupying the right side of the seat. Furthermore, if desired, a device 10, to be hereinafter described, may be of sufficient width to span the entire width of the windshield of the vehicle so as to be commonly useful to all the occupants of the front seat of the vehicle. Such an arrangement is unique inasmuch as the device 10 may be positioned so as to vary the amount of screening of light rays to accommodate occupants at either side of the vehicle, as will hereinafter be explained.

As best seen in FIGURES 1–5, inclusive, the panel 11 is reinforced at its uppermost fold or panel 21 by an angled stiffener member 22 secured thereto by a fastener in the form of a rivet 23, or the like. The panel is further reinforced at its lowermost fold or panel 24 by a stiffener member 26 secured thereto by similar fasteners in the form of rivets 27. The upper edge of the upper stiffener member 22 is preferably provided with a protecting strip 28 of pliant, resilient material, such as rubber, neoprene, or the like, to prevent scratching or cutting by the edge 29 when the panel 11 is manually operated, as will be hereinafter described. Optionally, the edge may be rolled or folded back to form a protective, smooth, upper edge.

The device 10 further includes a pair of spaced hinge means 31 and 32, each adjacent opposite side edges of the panel and each individually and independently controlling the extension and collapsing of the panel 11. Each hinge means 31 and 32 includes an uppermost link 33 pivotally secured to the uppermost fold of the panel 10, by a fastener such as the rivet or eyelet 34 extending through the link 33 and the stiffener member 22 and preferably through a portion of the uppermost fold 21, a lowermost link 36 pivotally secured as at 37 to a bracket 38, secured to the lowermost stiffener 26, and an intermediate link 39 pivotally secured at its ends to adjacent opposite ends of the links 33 and 36 by fasteners 41 and 42 in the form of rivets, eyelets, or the like. The hinges 31 and 32 are preferably spaced from the panel 11 by the provision of a spacer or enlarged shank portion 43 on the rivet 34 separating the link 33 a slight distance from the stiffener member 22.

It will now be more clearly understood by the foregoing description that the pleated, foldable panel 11 may be extended upwardly to form a shield between the occupants of the vehicle and reflecting surfaces of the vehicle, as required. The fully extended position, in which the panels 12 are in parallel relationship to each other, is illustrated in FIGURES 1, 3 and 4. It is to be understood, however, that the hinge members 31 and 32 may be independently operated to achieve any angular position of the panel desired to shield or block selective glaring reflected rays of light, as for example, the position illustrated in FIGURE 2.

Figure 2:
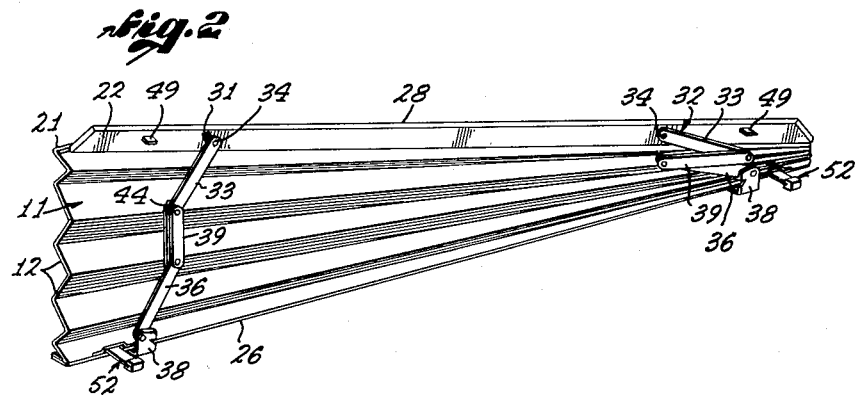
FIGURE 2 is a perspective view, in elevation, illustrating the device as folded in an angular, non-parallel position.

In FIGURE 2, the hinge member 31 is illustrated as being fully extended to afford a maximum extension at the left end of the panel 11, as viewed in this figure, whereas the right end of the panel is fully collapsed by collapsing the hinge means 32 thereat whereby substantially maximum vision through the windshield like 16 is achieved at the right end and minimum vision is achieved at the left end while blocking unwanted reflected glaring light rays. It is to be understood that the extremes are herein illustrated and that the hinge means 31 and 32 may be operated at positions intermediate thereof to achieve the desired result.

To prevent undue extension of the panel 11, limiting means are provided on each hinge means 31 and 32 in the form of stops 44 and 46 formed integrally with or secured to the intermediate link 39. The stops 44 and 46 are shown as tabs bent at a right angle and engageable with adjacent edges of the links 33 and 36, respectively, to limit extension of the hinges and thereby prevent overcenter travel of the hinges. For this purpose, the intermediate links 39 may be formed of a pair of discrete link members 47 and 48 sandwiching the adjacent ends of the links 33 and 36, the link 47 having a bent-over tab like the stop 44 and the link 48 having a similar bent-over tab like the stop 46.

To guide movement of the hinge means 31 and 32 into proper folding relationship, as the panel 11 is being collapsed, a pair of tabs 49 are formed integrally with or secured to the upper stiffener member 22, one tab 49 being adjacent to each link 33. The tabs 49 are engageable one with each link 33, as the stiffener member 22 descends downwardly to collapse the panel 11, so as to bias the links 33 into the position illustrated in FIGURE 5. An additional stop tab 51 is formed in each bracket 38 and engageable with an adjacent edge of its associated lowermost link 36 to guide the link into a substantially horizontal position when the hinge means 31 and 32 are folded and the panel 11 is completely collapsed.

The fasteners 34, 41, 42 and 37 are preferably prestressed so as to permit the links 33, 39 and 36 to pivot about their axes yet retain the links in any adjusted position so as to prevent the panel from inadvertently folding in in response to vibrations normally associated with vehicles.

The panel 11 is preferably mounted on the dashboard 14 so as to be adjustable in its position relative to the vehicle and in distance from the windshield. For this purpose a pair of spaced, lateral support members 52 are provided adjacent to each side edge of the panel 11 and each extending through one of a pair of sockets 53 and 53' formed integrally with or secured to the lowermost stiffener member 26 and thereby the lowermost fold 24 of the panel 11. In practice, the sockets 53 and 53' are formed by a pair of relatively-rigid strip members 54 having offset intermediate portions 55 forming openings between the strips 54 and the strip 26.

The support members 52, one being shown in FIGURE 6, are identical and are preferably formed of strip metal or the like, like the strip 56 of the figure. A forward end 57 is offset and adapted to be secured under the windshield molding strip 58 of the vehicle or, optionally by means of a fastener extending through an aperture 59 adjacent to the forward end 57. The rearward end 60 is preferably cushioned as by a pliant or resilient material secured thereto to prevent marring of the dashboard finish by the device and to absorb vibrations caused by the vehicle.

The intermediate portion of each strip 56 is provided with a plurality of longitudinally and laterally spaced protrusions or dimples indicated by the numeral 61 which, with the intermediate portion of the strip, form interference fits within the sockets 53 and 53'. The support members 52 are thereby extended through the sockets 53 and 53', respectively, and the panel 11 adjusted along the length of the support means so as to space the panel 11 a desired distance from the windshield and at a desired position relative ot the vehicle and the source of glaring light, whereas the protrusions 61 restrain the panel 11 from inadvertent movement after such adjustment.

It will now be more clearly understood by the foregoing description that the panel 11 may be vertically extended, as by grasping of the angle member 22, and applying an upward pull thereto to position the panel to block or intercept any glaring light rays reflected from the hood 17, accessories like the accessory 18 or ornamental features, like 19. An upward pull at the central portion of the stiffener member 22 effects a substantially parallel movement of the panels 12, as illustrated in the FIGURES 1, 3 and 4 whereas an upward pull at either end of the angle member effects an angled position of the panel 11. If necessary, one end may be pushed downwardly while the other end is pulled upwardly to achieve the extreme angular position of FIGURE 2. To fully collapse the panel a downward push at the central portion of the stiffener member 22 directs a substantially even force on the entire panel 11 and both hinges 31 and 32 to collapse the panel into the position illustrated in FIGURE 5.

While the instant invention has been shown and described herein in what is conceived to be the most practical and preferred embodiment, it is recognized that departures may be made therefrom within the scope of the invention which is therefore not to be limited to the details disclosed herein but is to be afforded the full scope of the claims.

What I claim as new and desire to secure by Letters Patent is:

1. An anti-glare device comprising: a multi-pleated, collapsible panel; means removably securing a lowermost fold of said panel to the dashboard of a vehicle; a pair of spaced brackets secured to said lowermost fold of said panel; a pair of hinge members, each of said hinge members including an uppermost link, a lowermost link, and an intermediate link, said uppermost link being pivotally secured at its uppermost end to said uppermost fold of said panel and at its lower end to one end of said intermediate link, and said lowermost link being pivotally secured at its lower end to one of said brackets and at its uppermost end to an opposite end of said intermediate link; said hinge members being selectively and independently foldable and unfoldable for respectively collapsing and extending said panel in parallel and non-parallel relationship of said folds.

2. An anti-glare device as defined in claim 1, including stop means on one of said links of said hinge members and engageable with another of said links for limiting the unfolding movement of said hinge members and thereby said panel and preventing said hinge members from movement into an overcenter position.

3. An anti-glare device as defined in claim 1, including means on said uppermost fold engageable with each said uppermost link of said hinge members for collapsing said hinge members in response to a downward movement of said uppermost fold to collapse said panel.

4. An anti-glare device as defined in claim 1, including stop means on each of said brackets and engageable with a respective lowermost link for limiting downward pivotal movement of said lowermost link.

References Cited in the file of this patent
UNITED STATES PATENTS

| | | |
|---|---|---|
| 730,677 | Marcus | June 9, 1903 |
| 1,383,668 | Smith | July 5, 1921 |
| 2,305,677 | Cotton | Dec. 22, 1942 |
| 2,345,106 | Erps | Mar. 28, 1944 |
| 2,350,305 | Lapina | May 30, 1944 |
| 2,584,557 | Cuthbertson | Feb. 7, 1952 |